United States Patent [19]

Fukushima et al.

[11] 3,926,876

[45] Dec. 16, 1975

[54] FLAME-RESISTANT RESINOUS MOLDING

[75] Inventors: Mitio Fukushima, Suita; Teruo Iwanami, Takatsuki, both of Japan

[73] Assignee: Nippon Gohsei Kagaku Kogyo Kabushiki Kaisha, Osaka, Japan

[22] Filed: June 21, 1974

[21] Appl. No.: 481,901

[52] U.S. Cl................ 260/23 R; 260/33.8 UA; 260/45.75 R; 261/88.7 R
[51] Int. Cl.² ........................................ C18L 91/00
[58] Field of Search ...... 260/23 R, 88.1 R, 45.75 R, 260/33.8 UA

[56] References Cited
UNITED STATES PATENTS

| | | | |
|---|---|---|---|
| 2,750,348 | 6/1956 | Baymiller | 260/23 R |
| 2,782,173 | 2/1957 | Bristol | 260/23 R |
| 3,075,944 | 1/1963 | Wick | 260/41 |
| 3,141,860 | 7/1964 | Sauer | 260/33.8 |
| 3,519,597 | 7/1970 | Weil | 260/45.75 |

*Primary Examiner*—M. J. Welsh
*Assistant Examiner*—William E. Parker
*Attorney, Agent, or Firm*—Armstrong, Nikaido & Wegner

[57] ABSTRACT

Flame-resistant resinous molding of ethylene-vinyl alcohol copolymer, 5 to 50 parts of a halo-organocompound, 0.2 to 10 parts of a metallic soap and 0 to 30 parts of antimony trioxide, said parts being parts by weight per 100 parts by weight of ethylene-vinyl alcohol copolymer. The blending of a thermoplastic resin having a solubility parameter of 8 to 12 based on Small's equation to the composition improves the molding property of the composition.

5 Claims, No Drawings

FLAME-RESISTANT RESINOUS MOLDING

BACKGROUND OF THE INVENTION

The present invention relates to a flame-resistant resinous molding, more particularly to an ethylene-vinyl alcohol molding.

Ethylene-vinyl alcohol copolymer is excellent in mechanical strength such as tensile strength or flexural strength and, oil-resistance, solvent-resistance and chemicals-resistance, and also has a property that the static charge is small. Therefore, applications to moldings such as machine parts, electric-device parts or vessels have been much expected. It is one of desirable conditions for resinous moldings mentioned above that they do not catch fire or at least they have a self-extinguishing property.

In case ethylene-vinyl alcohol copolymer moldings burn, water and carbon dioxide are generated. Accordingly, there is no fear of generating combustion gases harmful to the human body as in other resins, but the copolymer moldings once begin to burn, the combustion continues until they are burnt down. According to the Standard for Tests for Flammability of Plastic Materials by Underwriters' Laboratories in U.S.A. (UL 94), the copolymer passes as 94 HB, that is to say, the copolymer is ranked as a slow-burning resin.

Heretofore, there have been proposed various means for making into flame-resistance as to polyvinyl chloride, polyoleffin or polystyrene, but has not been known as yet a means for making ethylene-vinyl alcohol copolymer into flame-resistance.

According to the examination by the present inventors, incorporation of a halo-organocompound alone into ethylene-vinyl alcohol copolymer, which has been widely employed as a conventional flame retarder for plastics, causes to gel the copolymer at melt-molding and the molding becomes difficult. Even if molded by force, the copolymer is decomposed and a molding is remarkably colored.

OBJECTS OF THE INVENTION

It is an object of the present invention to provide a molding made of ethylene-vinyl alcohol copolymer having a flame-resistance.

A further object of the invention is to provide a flame-resistant molding having the advantageous characteristics of the ethylene-vinyl alcohol copolymer.

A still further object of the invention is to provide a process for preparing a flame-resistant molding made of ethylene-vinyl alcohol copolymer.

These and other objects of the invention will become apparent from the description hereinafter.

DETAILED DESCRIPTION

It has now been found that the above-mentioned objects can be attained by incorporating 5 to 50 parts by weight of a halo-organocompound, 0.2 to 10 parts by weight of a metallic soap and 0 to 30 parts by weight of antimony trioxide into 100 parts by weight of ethylene-vinyl alcohol copolymer. Such a composition can be molded by means of melt-molding under a usual condition without gelation so that a normal molding is possible, and can give a molding without coloring it. Moreover, the self-extinguishing property of the obtained molding is remarkably improved, and a molding can be employed in usual uses without any troubles.

Ethylene-vinyl alcohol copolymer is generally prepared by hydrolyzing ethylene-vinyl acetate copolymer in the presence of a hydrolyzing catalyst. As an ethylene-vinyl alcohol copolymer for moldings, there may be usually employed the copolymer having an ethylene content of 15 to 50 % by mole, a vinyl acetate content of 85 to 50 % by mole and a degree of hydrolysis in vinyl acetate component of not less than 85 % by mole. There may be also employed copolymers that no more than 5 % by mole in vinyl acetate component of the copolymer is replaced with another copolymerizable monomer, such as propylene, isobutylene, crotonic acid, acrylic acid, methacrylic acid, maleic acid and esters thereof. In the present invention, ethylene-vinyl alcohol having an intrinsic viscosity of 0.7 to 1.5 dl./g. in a mixture of phenol and water (87 : 13 by weight) at 30°C. is generally employed.

In the present invention, it is essential to blend the ethylene-vinyl alcohol copolymer with the halo-organocompound and the metallic soap in the specific ratios. In case of blending the halo-organocompound alone to the copolymer, the above-mentioned problems occur. Also, the blending of the metallic soap alone can not bring any effect on flame-resistance of the molding. In contrast to the impossibility of the practical use by blending such an ingredient alone to the copolymer, a remarkable effect on flame-resistance can be gained when these ingredients are employed in combination. The flame-resistance is more promoted by antimony trioxide and, therefore, the employment thereof in addition to the halo-organocompound and the metallic soap brings better result.

Examples of the halo-organocompound employed in the present invention are hexabromobenzene, perchloropentacyclodecane and derivatives thereof, tetrabromobisphenol A, tetrachlorobisphenol A, tetrabromophthalic anhydride, tetrachlorophthalic anhydride, di(tetrabromophenyl)imide, and the like. Especially, hexabromobenzene and perchloropentacyclodecanes are preferably employed in the present invention. The suitable amount of the halo-organocompound varies depending upon the halogen content thereof, but usually is selected from the range of 5 to 50 parts by weight, preferably 10 to 40 parts by weight, per 100 parts by weight of ethylene-vinyl alcohol copolymer. When the amount is less than 5 parts by weight, the effect on flame-resistance is insufficient. On the other hand, when the amount is more than 50 parts by weight, mechanical strength such as tensile strength or impact strength of the molding is remarkably decreased.

The metallic soaps employed in the present invention are metal salts of fatty acid other than alkali metal salts, such as calcium stearate, barium stearate, magnesium stearate, lead stearate, zinc stearate, cadmium stearate, cadmium laurate, barium laurate, zinc ricinoleate, barium ricinoleate, and the like. The amount of the metallic soap is selected from the range of 0.2 to 10 parts by weight, preferably 1 to 8 parts by weight, per 100 parts by weight of ethylene-vinyl alcohol copolymer. When the amount is less than 0.2 part by weight, the copolymer tends to occur gelation at the time of the melt-molding and also the effect for preventing the thermal decomposition of the copolymer is insufficient. On the other hand, when the amount is more than 10 parts by weight, the metallic soap bleeds to the surface of molding at the time of melt-molding and during use.

According to the present invention, antimony trioxide is preferably employed. In case of blending antimony trioxide, the amount thereof is selected from the range of not more than 30 parts by weight, preferably 3 to 20 parts by weight, per 100 parts by weight of ethylene-vinyl alcohol copolymer. Even if large amount over 30 parts by weight is employed, the mechanical strength of the obtained molding is decreased though the flame-resistance is further improved.

The ethylene-vinyl alcohol copolymer composition as mentioned above tends to have higher melt viscosity than ethylene-vinyl alcohol copolymer per se though the composition can be smoothly molded to give a flame-resistant molding. According to the present invention, the molding property of the composition can be improved by blending a thermoplastic resin having a specific solubility parameter to the above-mentioned composition. As a result, a flame-resistant molding having a smooth surface can be obtained without any trouble, such as thermal decomposition or the change in quality of the copolymer at melt-molding.

The term "solubility parameter" as used herein means a molecular cohesive-energy density and can be calculated in accordance with the following Small's equation:

$$\delta = \rho \Sigma F/M \quad [\text{cal.}/\text{cc.}]^{1/2}$$

wherein $\delta$ is a solubility parameter, $\rho$ is a density, $F$ is a molar-attraction constant of atom and radical, and $M$ is a molecular weight of structural unit.

As the thermoplastic resin employed in the present invention, resins having a solubility parameter of 8 to 12 are preferably employed. Examples of the thermoplastic resin are polyester rubber, ethylene-vinyl acetate copolymer, low molecular weight polyethylene, acrylonitrile-butadiene-styrene resin, ionomer such as Surlyn A made by E. I. du Pont de Nemours & Company, and the like. Polyisobutylene, polyacrylonitrile and 6,6-nylon of which solubility parameters are respectively 7.7, 12.7 and 13.6 are not effective. The amount of such a thermoplastic resin is selected from the range of 2 to 20 parts by weight, preferably 2 to 15 parts by weight, per 100 parts by weight of ethylene-vinyl alcohol copolymer. The employment in small amount is insufficient to improve the molding property, and the employment in large amount impaires the advantageous characteristics of ethylene-vinyl alcohol copolymer such as antistatic charge, solvent-resistance or chemicals-resistance.

The instant resinous composition is melt-molded usually at a temperature of 190° to 250°C. by a known means such as injection molding, extrusion, compression molding, vacuum casting, blow molding, rotational molding, and the like.

In addition to the above-mentioned ingredients, known additives such as filler, coloring agent, plasticizer and lubricant may be blended to the composition.

The present invention is more particularly described and explained by means of the following Examples, wherein parts are by weight unless otherwise specified.

EXAMPLE 1

To 100 parts of ethylene-vinyl alcohol copolymer ($[\eta]=1.165$) having an ethylene content of 34 % by mole, a vinyl acetate content of 66 % by mole and a degree of hydrolysis in vinyl acetate component of 98.0 % by mole, 20 parts of hexabromobenzene and 0.5 part of calcium stearate were blended. Then the obtained composition was molded at a temperature of 200°C. by means of extrusion to give a sheet having a thickness of one-sixteenth inch. From thus obtained sheet, test pieces having a thickness of one-sixteenth inch, a width of one-half inch and a length of 6 inches were prepared.

The result of the flammability test according to the provision of UL 94 was 94V-I. Also, the tensile strength and impact strength measured in accordance with the provision of ASTM D 638 and ASTM D 256 were 780 kg./cm.$^2$ and 7.8 kg.cm./cm.$^2$, respectively.

The molding prepared from ethylene-vinyl alcohol copolymer alone by the same manner as above had the same appearance, but the result of flammability test was "burning" and the tensile strength and impact strength were 810 kg./cm.$^2$ and 9.2 kg.cm./cm.$^2$, respectively.

As a control, the same procedure as above was repeated except that calcium stearate was not blended. The copolymer decomposed violently at the time of molding and the resulting molding was tinged with yellowish brown and, therefore, a satisfactory molding was not obtained.

Furthermore, the same procedure as above was repeated except that hexabromobenzene was employed in an amount of 55 parts instead of 20 parts. The obtained molding was tinged and had a little gloss. The tensile strength and impact strength were 380 kg./cm.$^2$ and 2.8 kg.cm./cm.$^2$, respectively.

EXAMPLE 2

To 100 parts of ethylene-vinyl alcohol copolymer ($[\eta]=1.170$) having an ethylene content of 27 % by mole, a vinyl acetate content of 73 % by mole and a degree of hydrolysis in vinyl acetate component of 99.5 % by mole, 20 parts of hexabromobenzene, 10 parts of antimony trioxide and 2 parts of barium stearate were blended. The obtained composition was then molded at a temperature of 230°C. by means of injection molding to give test pieces having a size of 1/16 × ½ × 6 inches.

Thus obtained test piece had a smooth surface and a good gloss, and passed 94V-O in UL 94. The tensile strength and impact strength of the test piece were 860 kg./cm.$^2$ and 8.3 kg.cm./cm.$^2$, respectively.

EXAMPLE 3

The same procedure as in Example 2 was repeated except that tetrabromophthalic anhydride was employed instead of hexabromobenzene.

The obtained molding has the similar properties to the molding obtained in Example 2.

EXAMPLE 4

To 100 parts of ethylene-vinyl alcohol copolymer ($[\eta]=1.161$) having an ethylene content of 45 % by mole, a vinyl acetate content of 55 % by mole and a degree of hydrolysis in vinyl acetate component of 90 % by mole, 20 parts of hexabromobisphenol A, 10 parts of antimony trioxide and 1.5 parts of barium stearate were blended. The obtained composition was then molded at a temperature of 190°C. by means of injection molding to give test pieces having the same size as in Example 1.

The test pieces had a smooth surface, and passed 94V-I in UL 94. The tensile strength and impact strength were 750 kg./cm.$^2$ and 12.1 kg.cm./cm.$^2$, respectively.

EXAMPLE 5

To 100 parts of ethylene-vinyl alcohol copolymer ($[\eta]=1.171$) having an ethylene content of 29 % by mole, a vinyl acetate content of 71 % by mole and a degree of hydrolysis in vinyl acetate component of 99.6 % by mole, 27 parts of Dechlorane plus 515 (made by Hooker Chemical Corp., of which main component was perchloropentacyclodecane or derivative thereof), 8 parts of antimony trioxide and 2 parts of barium stearate were blended. The obtained composition was then molded at a temperature of 245°C. by means of injection molding to give test pieces having a thickness of one-sixteenth inch.

As a result of measuring the flammability in accordance with the provision of UL 94, the test piece passed 94V-O. The result of the measurement of mechanical properties were as follows:

| | |
|---|---|
| Tensile strength: | 700 kg./cm.$^2$ |
| Elongation: | 20 % |
| Young's modulus: | 1.0 × 10$^{10}$ dyne/cm.$^2$ |
| Flexural strength: | 1,100 kg./cm.$^2$ |
| Flexural modulus: | 4.6 × 10$^4$ kg./cm.$^2$ |
| Impact strength: | 8.4 kg./cm.$^2$ |

EXAMPLES 7 to 9

The same procedures as in Example 6 were repeated except that the termoplastic resins shown in Table 1 were employed instead of the ionomer.

The results were shown in Table 1.

(Note 1) Molding property was determined by the presence of the inferior molding products and the present of the coloration of the copolymer during molding.

(Note 2) Self-extinguishing was tested by employing a test piece having a thickness of one-sixteenth inch according to the provision of UL 94.

(Note 3) Tensile strength, flexural strength and impact strength were measured according to the provision of ASTM D 638, ASTM D 790 and ASTM D 256, respectively.

(Note 4) The flammability of the molding prepared from the ethylene-vinyl alcohol copolymer alone was "burning."

Table 1

| Example No. | Trademark | Thermoplastic resin Kind | Solubility parameter | Molding property | Self-extinguishing | Property Tensile strength | Flexural strength | Impact strength |
|---|---|---|---|---|---|---|---|---|
| | | | | | | kg./cm.$^2$ | kg./cm.$^2$ | kg.cm/cm.$^2$ |
| 6 | Surlyn A 1652* | Ionomer | 9.4 | very good | 94V-O | 800 | 1200 | 7.0 |
| 7 | Elvax-40** | Ethylene-vinyl acetate copolymer | 8.5 | very good | 94V-O | 750 | 1100 | 8.0 |
| 8 | Hytrel 5555*** | Polyester rubber | 10.4 | good | 94V-O | 780 | 1200 | 7.5 |
| 9 | JSR-35**** | ABS resin | 9.1 | good | 94V-O | 750 | 1100 | 8.0 |

\* E. I. du Pont de Nemours & Company
\*\* E. I. du Pont de Nemours & Company
\*\*\* E. I. du Pont de Nemours & Company
\*\*\*\* Japan Synthetic Rubber Co., Ltd.

EXAMPLE 6

To 100 parts of ethylene-vinyl alcohol copolymer ([$\eta$]=1.171) having an ethylene content of 29 % by mole, a vinyl acetate content of 71 % by mole and a degree of hydrolysis in vinyl acetate component of 99.6 % by mole, 10 parts of the ionomer (Surlyn A 1652 made by E. I. du Pont de Nemours & Company) having a solubility parameter of 9.4, 27 parts of Dechlorane plus 515 (made by Hooker Chemical Corp.), 8 parts of antimony trioxide and 2 parts of cadmium stearate were blended. The obtained composition was molded at a temperature of 230°C. by means of injection molding to give test pieces having a size of 1/16 × ½ × 6 inches.

The molding property of the composition was good, and the flame-resistance and mechanical properties of the molded test piece were satisfactory.

The results were shown in Table 1.

As a control, the same procedure as in Example 5 was repeated except that 6,6-nylon having a solubility parameter of 13.4 was employed as a thermoplastic resin having a solubility parameter outside the range of 8 to 12 instead of the ionomer. There was no improvement of the molding property.

EXAMPLES 10 to 13

To 100 parts of ethylene-vinyl alcohol copolymer ([$\eta$]=1.165) having an ethylene content of 34 % by mole, a vinyl acetate content of 66 % by mole and a degree of hydrolysis in vinyl acetate component of 96.2 % by mole, 10 parts of the ionomer (Surlyn A 1652 made by E. I. du Pont de Nemours & Company) and the flame retarders shown in Table 2 were blended. The obtained composition was molded at a temperature of 230°C. by extrusion to give a sheet having a thickness of one-sixteenth inch.

The results were shown in Table 2.

Table 2

| Example No. | Flame retarder Halo-organocompound Kind | Amount | Barium stearate | Antimony trioxide | Molding property | Property Self-extinguishing | Tensile strength | Impact strength |
|---|---|---|---|---|---|---|---|---|
| | — | part | part | part | — | — | kg./cm.$^2$ | kg.cm./cm.$^2$ |
| 10 | Hexabromobenzene | 20 | 2 | 10 | good | 94V-O | 850 | 8.5 |
| 11 | Hexabromobenzene | 30 | 2 | 0 | very good | 94V-II | 800 | 8.0 |
| 12 | Tetrabromobisphenol A | 20 | 2 | 10 | good | 94V-O | 780 | 7.5 |
| 13 | Tetrabromophthalic anhydride | 20 | 2 | 10 | good | 94V-I | 750 | 7.0 |

What we claim is:
1. A flame-resistant resinous molding composition comprising a. ethylene-vinyl alcohol copolymer,
b. 5 to 50 parts of at least one halo-organocompound selected from the group consisting of hexabromobenzene, perchloropentacyclodecane and derivatives thereof, tetrabromobisphenol A, tetrachlorobisphenol A, tetrabromophthalic anhydride, tetrachlorophthalic anhydride and di(tetrabromophenyl)imide,
c. 0.2 to 10 parts of a metallic soap, and
d. 0 to 30 parts of antimony trioxide, said parts of (b), (c) and (d) being parts by weight per 100 parts of (a).

2. The flame-resistant resinous molding of claim 1, in which said molding is further incorporated with 2 to 20 parts by weight of a thermoplastic resin having a solubility parameter of 8 to 12 per 100 parts by weight of the ethylene-vinyl alcohol copolymer, said solubility parameter being the value calculated in accordance with the following Small's equation:
$$\delta = \rho \Sigma F/M$$
wherein $\delta$ is a solubility parameter, $\rho$ is a density, $F$ is a molar-attraction constant of atom and radical, and $M$ is a molecular weight of structural unit.

3. The flame-resistant resinous molding of claim 1, wherein said ethylene-vinyl alcohol copolymer consists of 15 to 50 % by mole of ethylene and 85 to 50 % by mole of vinyl acetate and of which degree of hydrolysis in vinyl acetate component is not less than 85 % by mole.

4. A process for preparing a flame-resistant molding composition made of ethylene-vinyl alcohol copolymer which comprises blending
5 to 50 parts by weight of at least one halo-organocompound selected from the group consisting of hexabromobenzene, perchloropentacyclodecane and derivatives thereof, tetrabromobisphenol A, tetrachlorobisphenol A, tetrabromophthalic anhydride, tetrachlorophthalic anhydride and di(tetrabromophenyl)imide,
0.2 to 10 parts by weight of a metallic soap, and
0 to 30 parts by weight of antimony trioxide to 100 parts by weight of ethylene-vinyl alcohol copolymer to give a composition, and melt-molding the composition at a temperature of 190° to 250°C.

5. The process of claim 4, in which said composition is further blended with 2 to 20 parts by weight of a thermoplastic resin having a solubility parameter of 8 to 12 per 100 parts by weight of the ethylene-vinyl alcohol copolymer, said solubility parameter being the value calculated in accordance with the following Small's equation:
$$\delta = \rho \Sigma F/M$$
wherein $\delta$ is a solubility parameter, $\rho$ is a density, $F$ is a molar-attraction constant of atom and radical, and $M$ is a molecular weight of structural unit.

* * * * *